United States Patent
Hu

(12) United States Patent (10) Patent No.: US 8,301,417 B2
Hu (45) Date of Patent: Oct. 30, 2012

(54) METHOD FOR IDENTIFYING THE ANALYTICAL TRANSITIONAL CROSS-SECTIONS OF A RIGID TRANSPORT ELEMENT

(75) Inventor: Weigang Hu, Redmond, WA (US)

(73) Assignee: The Boeing Company, Chicago, IL (US)

(*) Notice: Subject to any disclaimer, the term of this patent is extended or adjusted under 35 U.S.C. 154(b) by 1022 days.

(21) Appl. No.: 12/269,747

(22) Filed: Nov. 12, 2008

(65) Prior Publication Data

US 2010/0121611 A1 May 13, 2010

(51) Int. Cl.
*G06F 17/50* (2006.01)
*G06G 7/48* (2006.01)
(52) U.S. Cl. .............................................. 703/1; 703/7
(58) Field of Classification Search .................. 703/1, 7
See application file for complete search history.

(56) References Cited

U.S. PATENT DOCUMENTS

| 8,103,484 B2 * | 1/2012 | Ravnikar et al. ................. 703/1 |
| 8,112,255 B2 * | 2/2012 | Ravnikar et al. ................. 703/1 |
| 8,112,256 B2 * | 2/2012 | Ravnikar et al. ................. 703/1 |
| 2003/0101029 A1 | 5/2003 | Drumheller |
| 2007/0088530 A1 | 4/2007 | Erignac |

* cited by examiner

*Primary Examiner* — Kandasamy Thangavelu
*Assistant Examiner* — Nithya Janakiraman
(74) *Attorney, Agent, or Firm* — Ostrager Chong Flaherty & Broitman P.C.

(57) ABSTRACT

According to a preferred embodiment, a method for identifying the analytical transitional cross-sections of a rigid transport element is disclosed. The method includes providing a 3D model of a rigid transport element, a list of total edges from the 3D model, a list of total faces from the 3D model, and a list of connecting edges from the 3D model, identifying all edges from said list of total edges which have connectivity with any edge in the list of connecting edges and are part of a cross-section, placing the identified edges into a list of cross-section edges, and identifying the analytical cross-section that lies on the plane defined by the edges in said list of cross-section edges.

20 Claims, 8 Drawing Sheets

METHOD FOR IDENTIFYING THE ANALYTICAL TRANSITIONAL CROSS-SECTIONS OF A RIGID TRANSPORT ELEMENT

TECHNICAL FIELD

This disclosure generally relates to analyzing models in 3D Computer Aided Design (CAD) software. More particularly, the disclosure relates to a method for identifying the analytical transitional cross-sections of 3D models of rigid transport elements.

BACKGROUND

There are many situations requiring verification of an elongated part ("rigid transport element") whose cross-sectional shape varies along its length. For example, water pipes in buildings, pneumatic tubing in machinery, and tubing carrying fluids and liquids in aircraft, may all change in shape along the length of the part. In certain applications, such as applications relevant to the aerospace industry, tubing may be required to be placed in different areas of an aircraft, for example, that impose widely varying and severe constraints on the shape of the tubing. A consequence of a changing cross-sectional shape of a rigid transport element is a variation in the maximum amount of liquid that can flow through the element, or a variation in the pressure of a gas that flows through the element. In order to ensure that a rigid transport element is satisfactory for intended uses, an engineer or other personnel must verify the rigid transport element by conducting analyses, checking, for example, that pressure changes of fluids flowing through the rigid transport element do not exceed tolerances.

In order to verify the rigid transport element, particular cross-sections of the tubing must be located and analyzed, and characteristics or those cross-sections, such as area, shape, and position relative to adjacent cross-sections must be determined. The cross-sections that must be located and analyzed are called analytical transitional cross-sections. Referring to FIGS. 1A and 1B, an example of a rigid transport element 200 is shown. FIG. 1A shows a representation of the rigid transport element 200 and FIG. 1B shows all analytical transitional cross sections 201-204 of the element 200.

Previously, location of these analytical transitional cross-sections had been done in a non-automated fashion, by an operator using a three dimensional Computer Aided Design (3D CAD) system. Prior to verification, a 3D CAD model of the rigid transport element to be tested would be created by a design engineer or other operator in a 3D CAD environment. The 3D CAD model would be saved to a non-volatile memory location such as a hard disk. A verification engineer or other similar operator would load the 3D CAD model of the rigid transport element to analyze and verify that the design of the element meets technical requirements. Verification would consist of manually determining the locations of the analytical transitional cross-sections. Each analytical transitional cross-section would then be analyzed for perimeter, radius, area, axis length and shape between two cross-sections, bend angle, and total length of the rigid transport element, as well as other features.

One problem with any manual procedure is that it is very time consuming since each model must be manually analyzed. A further problem is that manual analysis subjects the verification procedure to human error. A further problem is that a manual analysis does not allow for complete automation of the fluid dynamics analysis procedure.

Therefore, there is a need for an automated method of determining the analytical transitional cross-sections of a rigid transport element.

Disclosure of such an automated method requires understanding of some basic features of 3D CAD systems. Generally, 3D CAD systems allow an operator to create a computer representation (a model) of a three dimensional object. A 3D model is stored in a computer as a collection of "primitive elements." These primitive elements may be of several types, such as edges, faces, and points. Edges are connected to each other at points. A 3D structure is defined by its "boundary representation," or the collection of border objects that demarcate the space occupied by the 3D object. As an example of a full 3D model, the boundary representation for a square consists of 4 edges, 4 points, and a face. The boundary representation of a cube would consist of 8 edges and 8 points and six faces. A structure of a cylinder is defined by circular boundary cross-sections and cylindrical faces.

For further illustration of CAD features, reference is now made to FIG. 2. A model of a rigid transport element 10 is generally comprised of pseudo-cylindrical faces 51-52, and 91-96, cross-sections 20, 60 and 100, and longitudinal edges 41-42 and 81-86. The first end 20 of the model 10 is circular, which in a 3D CAD representation, is usually composed of two semi-circular edges 21-22, each with two end-points 31-32.

This model 10 consists of a circle 20, longitudinally connected to another circle 60, longitudinally connected to a rectangle 100. We will call the portion of the model between the two circles 20 and 60 a first "segment" 40 and the portion of the model between the second circle 60 and the rectangle 100 a second "segment" 80.

In the first segment 40, there are two longitudinal edges 41-42 which divide up the segment 40 into two semi-cylindrical faces 51-52. The boundary representation of face 51 comprises semi-circular edge 22, longitudinal edges 41-42 and arc-edges 62-64 (the circle 60 is comprised of 6 edges, rather than 2, because of the fact that it is connected with a rectangle 100). In the second segment 80, there are 6 longitudinal edges 81-86, defining 6 faces 91-96 and connected to cross-sections 60 and 100. The foregoing example provides illustration of some features present in 3D CAD systems. Additional definitions of terms used in this disclosure are as follows:

Rigid Transport Element: a 3D conduit structure, such as a hollow elongated element that can carry fluid.

List: a data structure into which elements may be placed, and out of which elements may be moved, copied or deleted.

Primitive Element: a basic element out of which CAD models are formed.

Edge or Topological Edge: an edge is a primitive curved or straight line element that follows a particular path and can be used to define a two or three dimensional object.

Face or Topological Face: a face is a primitive surface element which can be used to define a three dimensional object.

Analytical transitional cross-section or Analytical Cross-Section: a cross-section of a rigid transport element which is used to calculate diagnostic characteristics of the rigid transport element.

Connectivity: for one edge to have connectivity with another edge means that an edge shares an endpoint with another edge.

Planar intersectional curve: a 2D curve formed by intersecting a 3D surface with a plane. A planar intersectional cross-section curve is a 2D curve formed by intersecting a 3D surface of a hollow object such as a rigid transport element with a plane at a cross-section of the hollow object.

SUMMARY

This disclosure is directed to a method and system for automated identification of analytical transitional cross-sections from a 3D CAD model of a rigid transport element. The disclosed embodiments analyze the primitive elements of the 3D CAD model to determine where the analytical transitional cross-sections are located. The method also optionally calculates circumference and radius of the cross-sections, as well as length between two cross-sections, curve length and bend angle between two sections if the rigid transport element is not straight. The method is preferably implemented in a computer system with 3D CAD software.

In this disclosure, various embodiments of a method known as the "Identify, Locate, and Create" (ILC) method are discussed. The ILC method identifies and locates analytical transitional cross-sections of a 3D model of a rigid transport element. The Identify, Locate, and Create method is advantageously implemented on a computer system. One preferred embodiment of the ILC method is as follows: A method for identifying analytical transitional cross-sections from a 3D CAD model of a rigid transport element, wherein the method accepts as input a list of total edges from the 3D model, a list of total faces from the 3D model, and a list of connecting edges, comprising: identifying all edges from said list of total edges which have connectivity with any edge in said list of connecting edges and are part of a cross-section, and placing the identified edges into a list of cross-section edges; and identifying the analytical cross-section that lies on the plane defined by the edges in said list of cross-section edges.

Optionally, the method can identify every analytical cross-section in a 3D CAD model of a rigid transport element by repeating the above method until all cross-sections have been found.

Optionally, an operator may select one end-cross-section (an analytical cross-section at an end of the rigid transport element) of the rigid transport element at which to begin the method for identification of the analytical transitional cross-sections.

The method is flexible in that if a user selects only a small portion (e.g., one or two edges) of one end-cross-section of the rigid transport element, the method provides for automated retrieval of all remaining edges in that end-cross-section.

Advantageously, the method can use the analytical transitional cross-sections that have been identified to calculate diagnostic characteristics of the rigid transport element, such as circumference and radius of the cross-sections, as well as length between two cross-sections, curve length and bend angle between two sections if the rigid transport element is not straight.

Another preferred embodiment of the ILC method is as follows. A 3D model of a rigid transport element is accepted as input, and a topological body is retrieved from the 3D CAD model. All topological edges and all topological faces are retrieved from the topological body to form a list of total edges and a list of total faces. An end-cross-section of the rigid transport element is then found. To do this, all topological edges in the list of total edges of which no duplicate exists are retrieved and placed into a list of end-cross-section edges. The list of end-cross-section edges is used to hold all edges which lie at either end of the rigid transport element. One edge from the list of end-cross-section edges is chosen and placed into a list of cross-section edges. The list of cross-section edges is a working list, used to hold the edges of the next analytical cross-section while all edges in the next analytical cross-section are being found. All edges in the list of end-cross-section edges that have connectivity with the edge in the list of cross-section edges are found and added to the list of cross-section edges.

The list of cross-section edges now contains some, but not necessarily all, of the edges at one end of the rigid transport element. The 2D cross-sectional plane on which all edges in the list of cross-section edges lie is found, and all edges from the list of total edges that lie on this 2D cross-sectional plane are added to the list of cross-section edges, replacing whatever was there previously. At this point, all edges at one of the end-cross-sections are in the list of cross-section edges. The 2D cross-sectional plane is stored in a list of cross-section planes for later use.

The edges in the list of cross-section edges are removed from the list of total edges. The edges in the list of total edges having connectivity with the edges found in the list of cross-section edges are retrieved and placed into a list of connecting edges. The list of connecting edges is used to hold the longitudinal edges of different segments of the model. The edges in the list of connecting edges are removed from the list of total edges. All edges in the list of total edges that have connectivity with any element in the list of connecting edges are placed into a list of candidate cross-section edges. The list of candidate cross-section edges is used to hold all edges which may be part of an analytical cross-section. Because of the nature of the foregoing steps, more edges than just those which are located on an analytical cross-section may be held in the list of candidate cross-section edges. The method must therefore screen out those edges that are not part of an analytical cross-section.

To do this, all edges in the list of candidate cross-section edges which do not share a face with any edge in the list of connecting edges are removed. The list of cross-section edges is emptied and all edges in the list of candidate cross-section edges are placed into the list of cross-section edges. At this point, the list of cross-section edges contains some of the edges in the next analytical transitional cross-section. This procedure is repeated from the step of creating the 2D cross-sectional plane, until all cross-sections are found. The end result of this procedure is that all analytical transitional cross-sections in the 3D CAD model have been identified.

Once analytical cross-sections are identified, they can be used to calculate characteristics of the rigid transport element for verification or for other uses.

Other objects, features, and advantages of the present invention will be explained in the following detailed description of the invention having reference to the appended drawings.

BRIEF DESCRIPTION OF THE DRAWINGS

Reference will now be made to the drawings in which similar elements in different drawings bear the same reference numerals.

DETAILED DESCRIPTION OF THE PREFERRED EMBODIMENTS

In one preferred embodiment, a computer system, containing volatile memory, non-volatile memory, a central processing unit, display, and input devices implements a preferred embodiment of the method disclosed herein.

Located in non-volatile memory, there may be Computer Aided Design (CAD) software, used to create, manipulate, and view 2D or 3D models. One example of a CAD software is CATIA V5, available from Dassault Systemes of France. The method described in this disclosure is preferably implemented in conjunction with a 3D CAD system.

Figure 9:
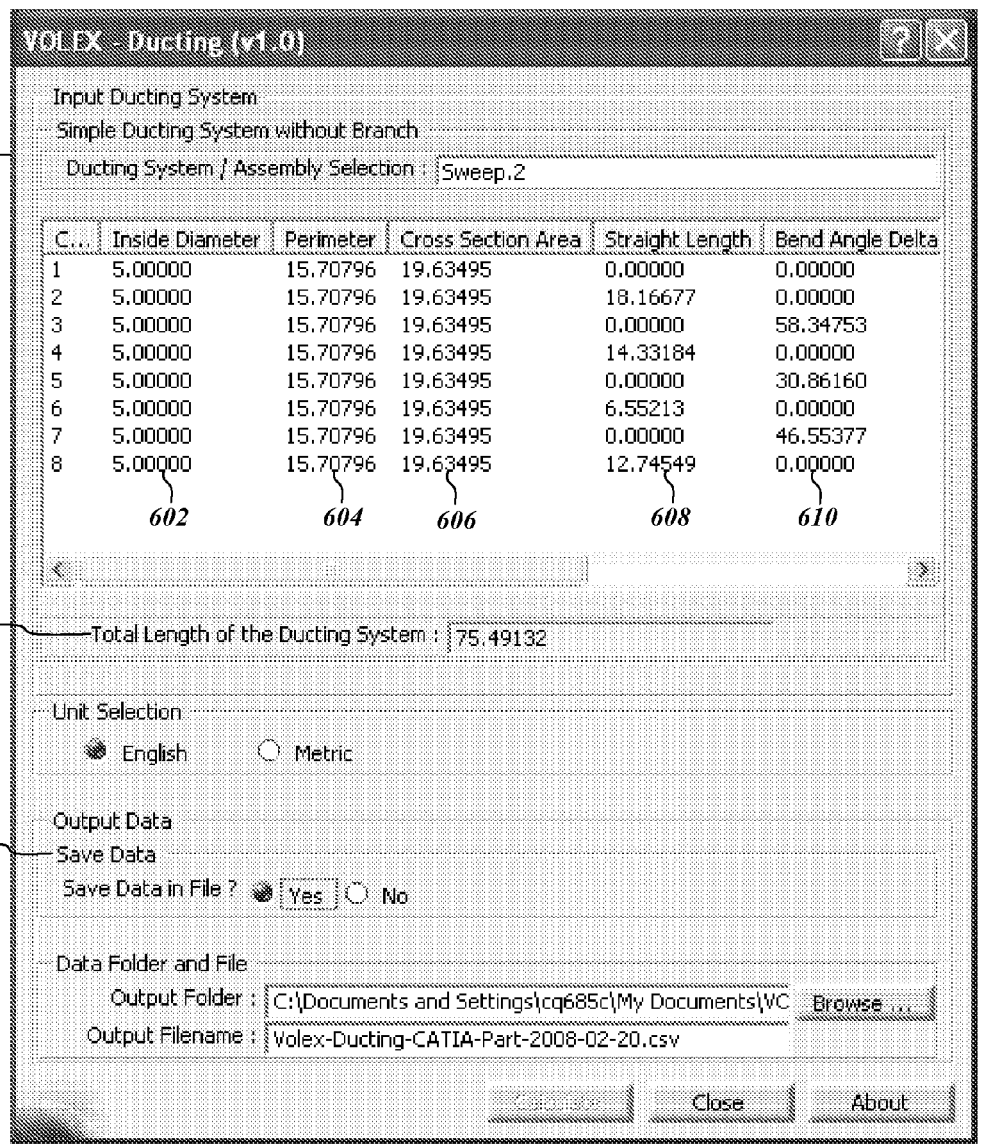
FIG. 9 depicts a sample GUI for one embodiment of a computer system implementing the method described in this disclosure.

An operator using the computer system may input instructions to create and manipulate 3D models in the CAD software. The operator may also input commands and receive output from an implementation of an embodiment of the method disclosed herein. FIG. 9 depicts a GUI produced by a preferred implementation of the disclosed method.

Figure 1A:
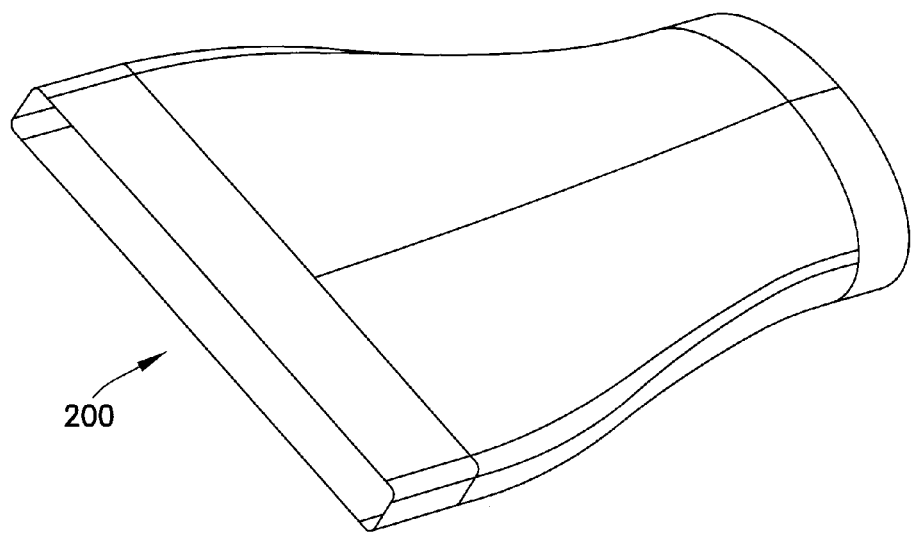
FIG. 1A depicts a sample 3D CAD model of a rigid transport element.
Figure 1B:
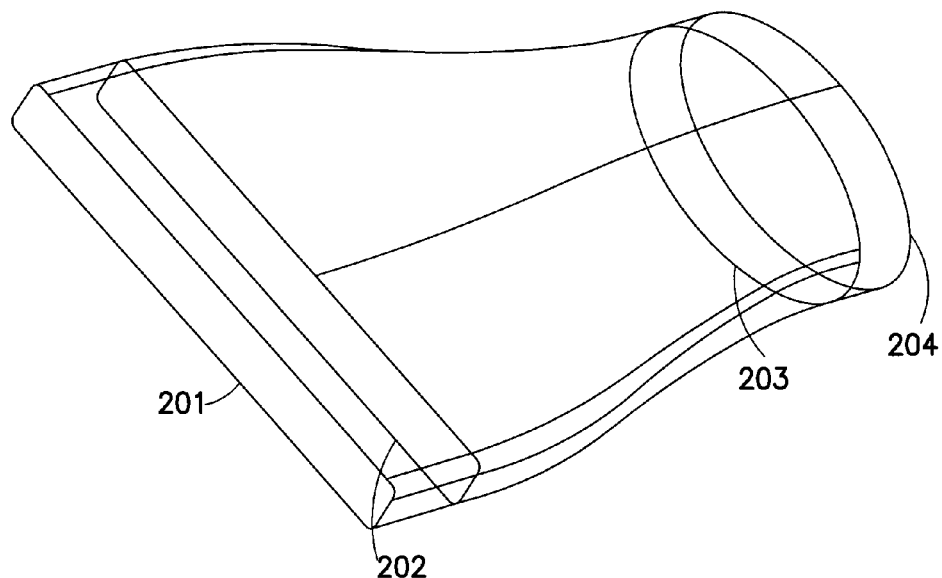
FIG. 1B depicts the 3D CAD model after the method described in this disclosure has been applied.

For illustration of a preferred embodiment of a method of identifying the analytical cross-sections of a rigid transport element, FIG. 1A and FIG. 1B, depicting a sample model of a rigid transport element 200, are now considered together. In FIG. 1A, the solid lines on the 3D surface are the edges which represent the boundary of the 3D structure. Application of the method described in this disclosure to the model in FIG. 1A allows identification of the analytical cross-sections 201-204, as shown in FIG. 1B.

Figure 6:
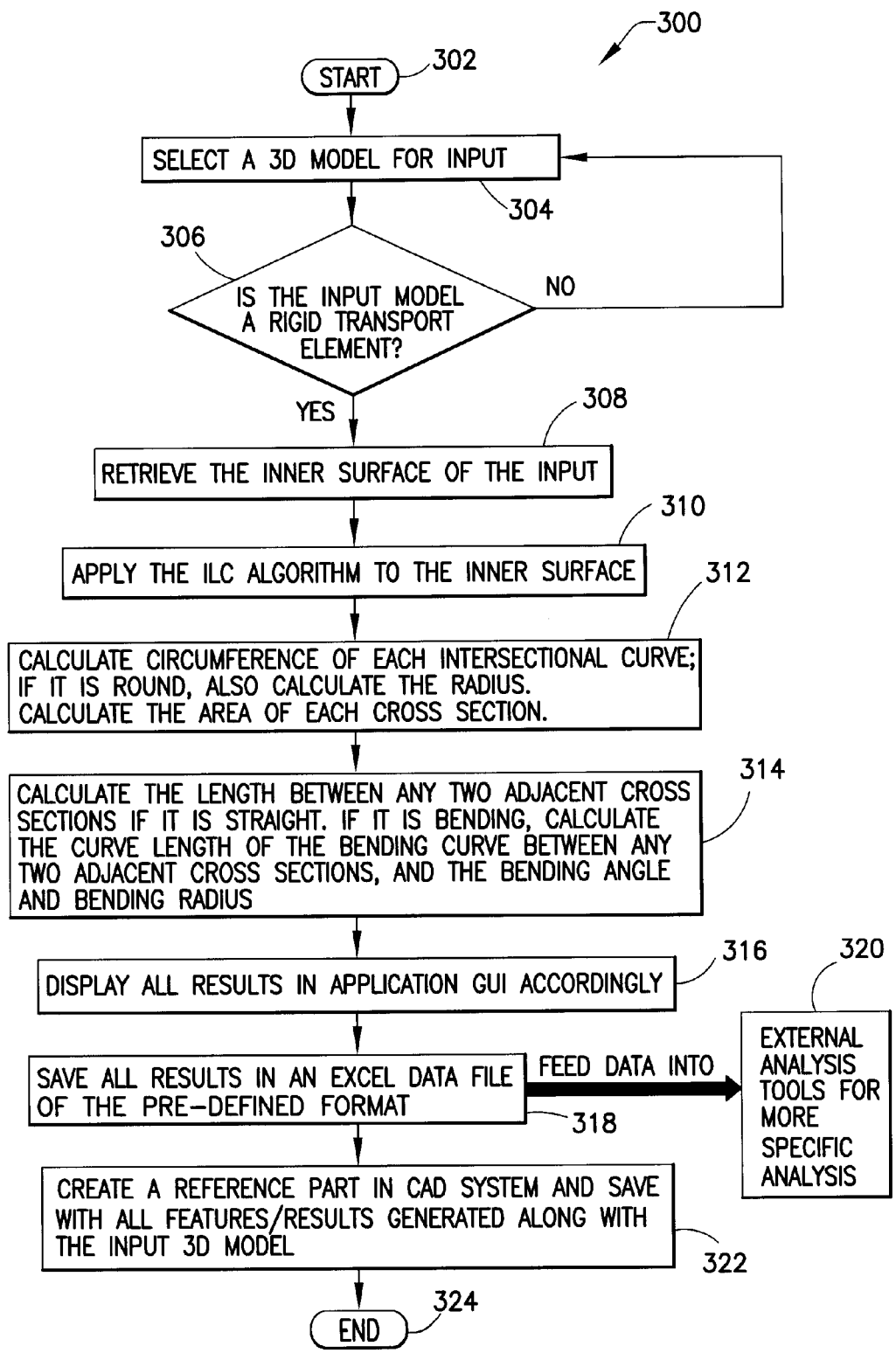
FIG. 6. depicts a flow-chart of the method described in this disclosure.

FIG. 6, which is a flowchart depicting the steps of a preferred embodiment of the method described in this disclosure, is now considered. In the first step 304, a 3D model is chosen as input to the system. In step 306, the model is checked to verify that it is a rigid transport element. If it is, then in step 308 the inner surface of the 3D model is retrieved. According to a preferred embodiment, to retrieve the inner surface of the 3D model, the model is checked to see whether it is solid (has thickness). If it is solid, the inner surface is found. If it is not solid, it is therefore a single surface, and it must be determined whether it is an outer or inner surface of a model. If it is an outer surface, a thickness of the model is determined. The inner surface is then found based on the outer surface and the thickness of the model. If the surface presented is an inner surface, no further action is required.

The Identify Locate and Create (ILC) method is applied, in step 310, to the 3D model of the inner surface. This method identifies and locates the analytical cross-sections of the 3D model. A flow chart of this method is shown in FIG. 7 and is discussed below.

After the analytical transitional cross-sections are identified by the ILC method, the method will, in step 312, calculate circumference of each intersectional curve; and if it is round, the method will also calculate the radius. Further, it will calculate the area of each cross section. It will also, in step 314, calculate the length between any two adjacent cross sections if it is straight; if the model of the rigid transport element has a non-straight shape, the method will calculate the curve length of the bending curve between any two adjacent cross sections, and the bending angle and bending radius. In step 316, the results of the calculations are displayed to the application GUI. The data is optionally stored in non-volatile memory in step 318. The data may also, in step 320, optionally be exported to external analysis tools. Finally, in step 322, a reference part with the newly generated features and results is created in the CAD system.

Figure 7A:
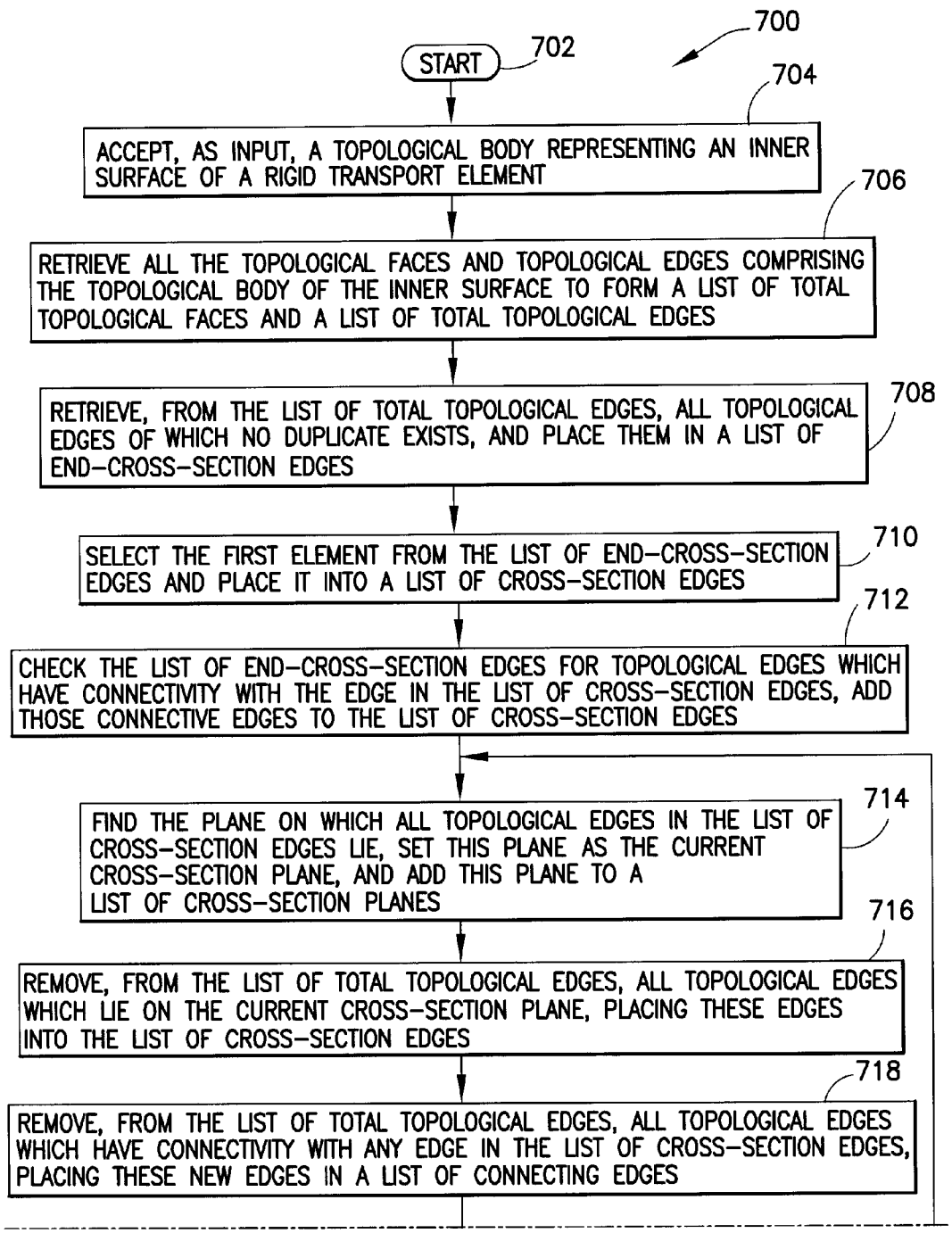
FIG. 7 depicts a flow-chart for the Identify Locate Create (ILC) method.
Figure 7B:
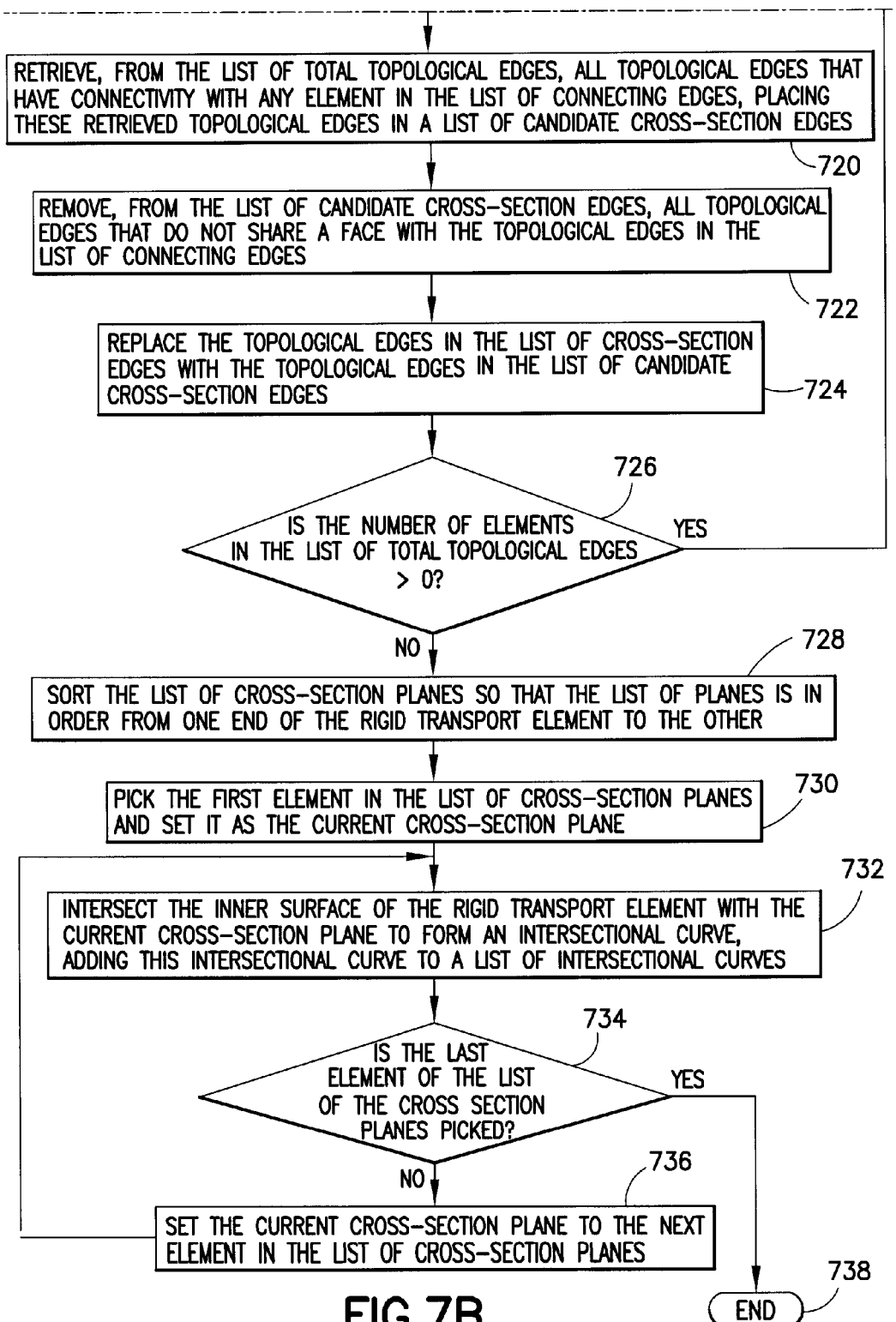

FIG. 2-5 and FIG. 7 depict application of a preferred embodiment of the ILC method and are now considered together. FIG. 2-FIG. 5 depicts portions of a 3D model illustrating a preferred embodiment of the ILC method. FIG. 7 depicts a flowchart of the ILC method.

Figure 2:
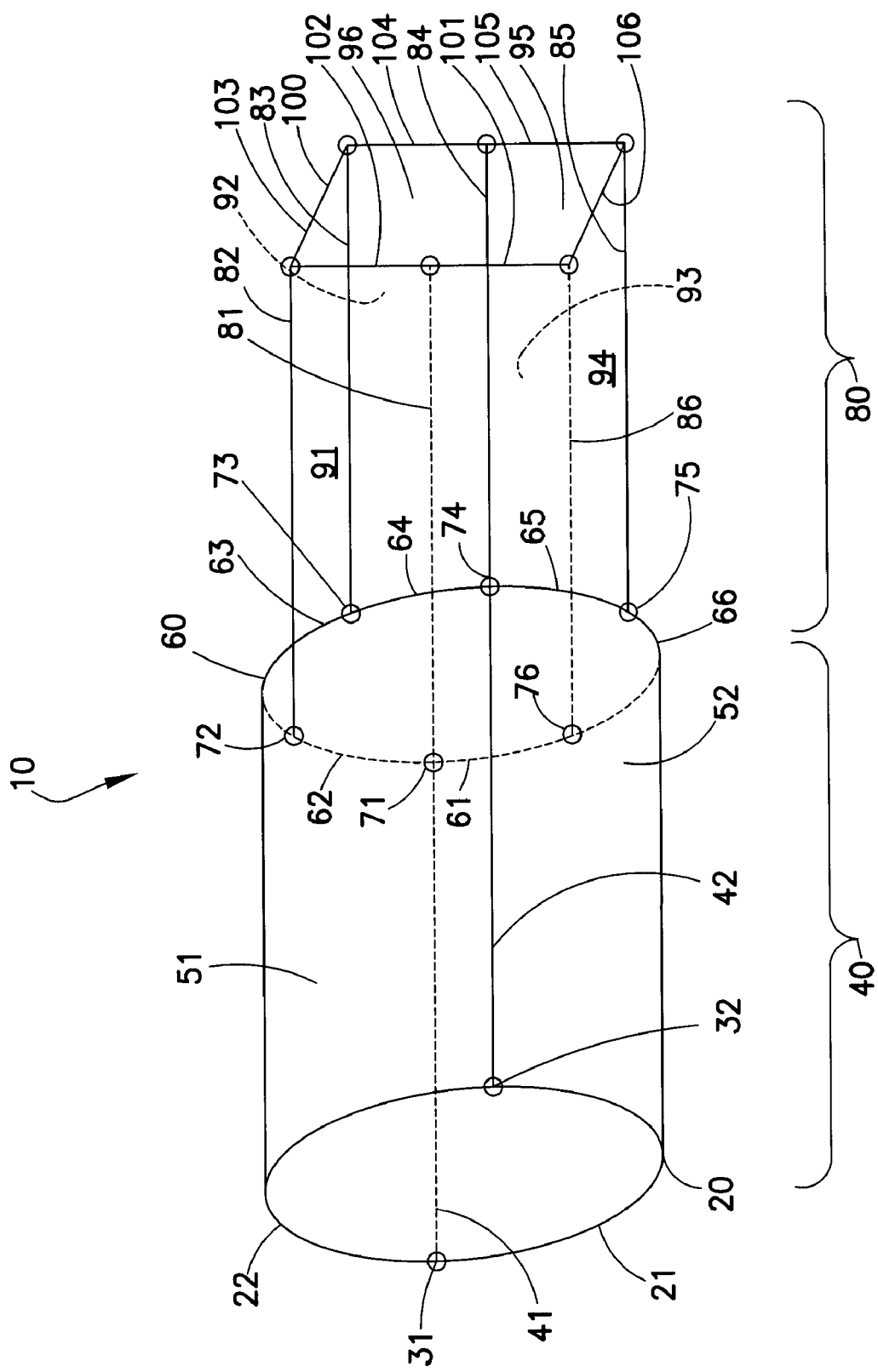
FIG. 2 depicts another sample 3D CAD model for demonstrating the function of the method described in this disclosure.

FIG. 2 depicts a 3D model of a rigid transport element 10. The rigid transport element 10 is composed of longitudinal segments 40 and 80. The left-most segment 40 comprises two faces 51 and 52 (semi-cylinders), two cross-sections 20 and 60, eight vertices 31, 32, 71-76, and ten edges 21, 22, 41, 42, and 61-66. The right-most segment 80 comprises six faces 91-96, two cross-sections 60 and 100, twelve vertices 61-66 and 111-116, and eighteen edges 61-66, 81-86, and 101-106.

The first step 704 in the ILC method is to accept a topological body representing an inner surface of a rigid transport element. In the next step 706, the ILC method retrieves all topological faces 51-52, and 91-96, from the 3D model and places those into a list of total topological faces. It then retrieves all topological edges 21, 22, 41, 42, 61-66, 81-86, and 101-106, and places those into a list of total topological edges.

To find all analytical transitional cross sections of the 3D model, the ILC method requires a starting analytical transitional cross section (an end-cross-section). Therefore, in the next step 708, the method retrieves, from the list of total topological edges, any edges of which no duplicate exists, and places the found edges into a list of end-cross-section edges.

This procedure works because each face has its own set of bounding edges. For example, semi-cylindrical face 51 has bounding edges 22, 41, 42, 62, 63, and 64. Face 96 has bounding edges 64, 83, 104, and 84. Semi-cylindrical face 52 has bounding edges 21, 41, 42, 61, 65, and 66. In other words, face 52 and face 51 each has its own set of edges 41 and 42. Similarly, face 96 and face 51 each has its own edge 64.

What this means is that all "interior" edges (edges not found on an outer cross-section) have at least one duplicate, since at least two faces border all interior edges. The only edges that do not have duplicates are the edges of the cross-sections at each end of the rigid transport element, because only one face borders those edges. Therefore, to locate the edges in the end cross-sections, the ILC method searches through all edges in the list of total edges to find those edges which have no duplicates. The outcome of this is a list of all edges 21, 22, and 101-106 located in either one of the end cross-sections 20 and 100 of the rigid transport element 10. Once these edges are found, they are placed into a list of end-cross-section edges.

In step 710, to select a single end cross-section as a starting point, an edge in the list of end-cross-section edges is selected and placed into a list of cross-section edges. The edge is removed from the list of end-cross-section edges. For illustration, assume edge 101 is chosen. In step 712, all the edges in the list of end-cross-section edges 102-106, and 21-22 that have connectivity with edge 101 are found, placed into a list of cross-section edges, and removed them from the list of end-cross-section edges. In FIG. 2, edges 102 and 106 are the only edges in the list of end-cross-section edges that have connectivity with edge 101. They are therefore placed into the list of cross-section edges. A characteristic of all the edges in the list of cross-section edges 101, 102, and 106 is that they all lie on the same 2D plane. Therefore, to identify the other edges that are part of that cross-section, the remaining edges in the list of end-cross-section edges 21, 22, and 103-105 are checked in step 714 to see if they lie on this 2D plane, and in step 716, those which do, 103-105, are placed into the list of cross-section edges. The list of cross-section edges 101-106 now contains all edges of one end-cross-section 100. The 2D plane is stored in step 714, in a list of cross-section planes to be used later.

Alternatively to steps 708-714, a user can manually select all edges located on either end-cross-section and they will be placed into a list of cross-section edges.

Alternatively, a user can select one edge which is a 2D curve located on either end-cross-section. Then, the 2D plane on which this edge is located will be found, and then all edges in the list of total edges which are located on this plane are found and placed into the list of cross-section edges.

Alternatively, if a user selects an edge which is a straight line instead of a 2D curve, the user should select another edge which lies on the same end-cross-section. The method will then find the 2D plane on which these edges are located, and then find all edges in the list of total edges which are located on this plane, placing all these edges into the list of cross-section edges and storing the 2D plane in a list of cross-section.

Still referring to FIG. 2, as described above, either cross section 20 or 100 may be chosen as the starting end-cross-section. Assume now for illustrative purposes that the circular cross-section 20 is chosen. This means that edges 21 and 22 are in the list of cross-section edges.

At step 716, the edges in the list of cross-section edges are removed from the list of total edges. In the next step 718, the list of total edges is checked for edges that have connectivity with the edges in the list of cross-section edges, and any edges found are placed into a list of connecting edges, and removed from the list of total edges. In FIG. 2, the edges 41 and 42 would be placed into the list of connecting edges because they share endpoints 31 and 32 with the edges 21 and 22 of circular cross-section 20, and the edges 41 and 42 would be removed from the list of total edges.

Figure 3:
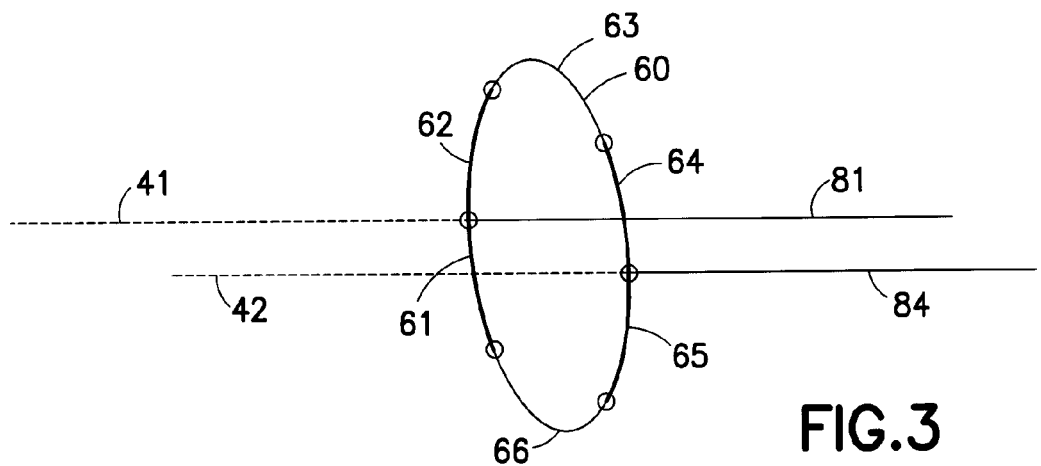
FIG. 3 depicts a portion of the 3D model from FIG. 2.

From here, the next cross-section is obtained. To do this, the list of total edges is checked, in step 720, for all edges that have connectivity with the edges in the list of connecting edges. These edges are placed into a list of candidate cross-section edges. The list of candidate cross-section edges can contain both edges that are on the next cross-section, as well as longitudinal edges (edges that "connect" two analytical cross-sections, and run along the length of the rigid transport element) in the next segment. Referring to FIG. 3, one can see that edges 61, 62, 64, 65, 81, and 84 have connectivity with the edges in the list of connecting edges 41 and 42. These edges are therefore all placed into a list of candidate cross-section edges.

Figure 4:
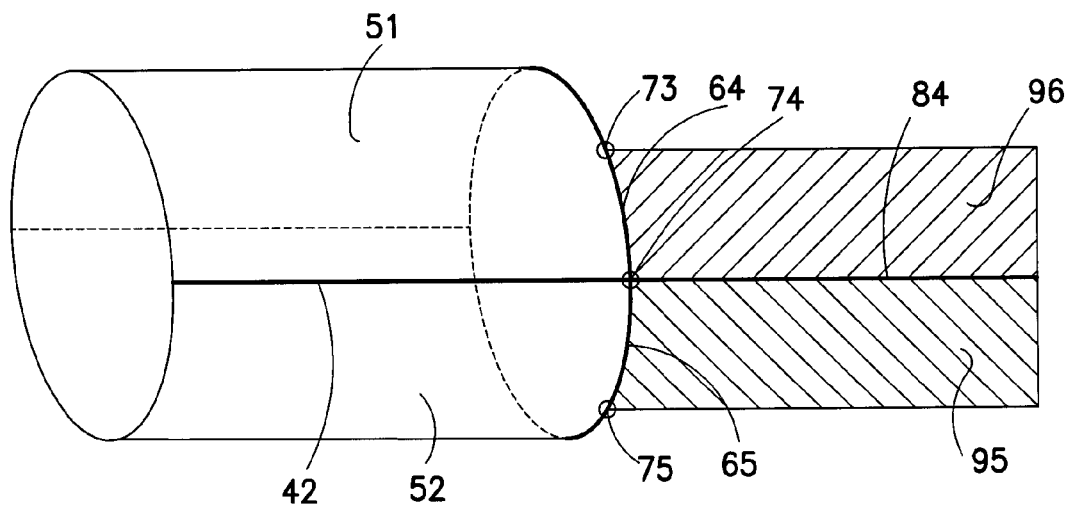
FIG. 4 depicts a portion of the 3D model from FIG. 2.
Figure 5:
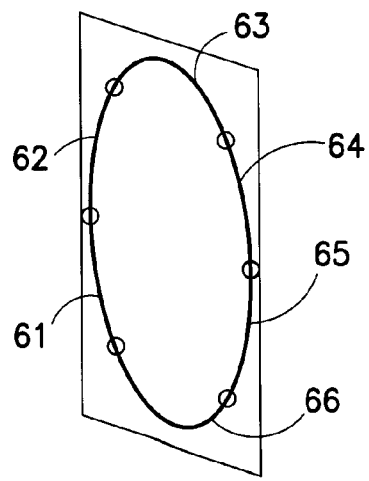
FIG. 5 depicts using a 2D plane to obtain all cross-section edges of cross section 60 from the model of FIG. 2.

Referring to FIG. 4, the next step 722 is to figure out which of these candidate cross-section edges are cross-section edges, as opposed to longitudinal edges. This can be done by checking every edge in the list of candidate cross-section edges to see whether it shares a face with any edge in the list of connecting edges. If it does not, it is removed from the list of candidate cross-section edges.

In a preferred embodiment, checking whether any edge in the list of candidate cross-section edges shares a face with any edge in the list of connecting edges can be done as follows. An edge is identified from the list of candidate cross-section edges, and all faces in the list of total faces which border on the identified edge are found and placed into a list of bordering faces. Any edges in the list of connecting edges which border on any face in the list of bordering faces are found. If no such edge is found, the identified edge is removed from the list of candidate cross-section edges. All these steps are repeated until all edges in said list of candidate cross-sections have been compared to all edges in said list of connecting edges in this fashion.

As an illustration of this procedure to remove all edges from the list of candidate cross-section edges which are not part of a cross-section, see FIG. 4. Assume the candidate cross-section edge 84 is chosen first. Edge 84 borders on faces 95 and 96. The two edges in the list of connecting edges are 41 and 42, which each border on faces 51 and 52. Since candidate cross-section edge 84 does not border on any faces that either connecting edges 41 or 42 border on, candidate cross-section edge 84 is not a cross-section edge, and is removed from the list of candidate cross-section edges. (Referring to FIG. 2 and FIG. 3, the same result is obtained by applying this procedure to candidate cross-section edge 81, which borders on faces 92 and 93.) Moving to candidate cross-section edge 64, one can see that it borders faces 51 and 96. Since candidate cross-section edge 64 borders on face 51, which at least one connecting edge 42 borders on, candidate cross-section edge 64 is an edge of the next analytical cross-section, and it is therefore not removed from the list of candidate cross-section edges. (The same result is obtained by applying this procedure to candidate cross-section edges 61, 62, and 65.) After this procedure is applied to the list of candidate cross-section edges, the list of candidate cross-section edges contains edges 61, 62, 64, and 65. The next step 724 is to empty the list of cross-section edges and place the edges in the list of candidate cross-section edges into the list of cross-section edges.

In the next step 726, the list of total edges is checked to see whether any edges remain. If edges do remain, the method dictates returning to step 714. If there are none left, the method dictates going on to step 728.

Continuing the walkthrough applying the ILC method to the example model 10, the method dictates looping back to step 714 since there are still edges remaining in the list of total edges. The next step is to obtain the 2D plane on which all edges in the list of cross-section edges 61, 62, 64, and 65 lie. Then the list of total edges is searched for all edges which lie on that plane, which are edges 61-66. Next, the list of cross-section edges is emptied, all edges that lie on this 2D plane are added to the list of cross-section edges, and this 2D plane is added to the list of cross-section planes.

The plane for the second analytical cross-section 60 has now been found. The method continues until all analytical transitional cross-sections are identified.

Once all analytical transitional cross-sections are identified, no elements remain in the list of total edges, and the loop ends. Alternatively, the loop may end when any stop condition is met. In one preferred embodiment, a stop condition is met when no elements remain in the list of total edges. The method dictates proceeding to step 728. Here, list of cross-section planes is sorted so that the list is in order from one end 20 of the rigid transport element 10 to the other end 100. In the next step 730, the first element in the list of cross-section planes is chosen and sets as the current cross-section plane. In step 732, the rigid transport element model 10 is intersected with the current cross section plane to obtain a planar intersectional cross-section curve which is stored in a list of planar intersectional cross-section curves. These planar intersectional cross-section curves lie at the transitional analytical cross-sections. In the next step, the current cross-section plane is checked to see whether it is the last element in the list of cross-section planes. If it is not, the method dictates looping back to step 732. If it is, the method dictates proceeding to step 738, and the ILC method is ended. The planar intersectional cross-section curves can be used to calculate various needed parameters.

Figure 8:
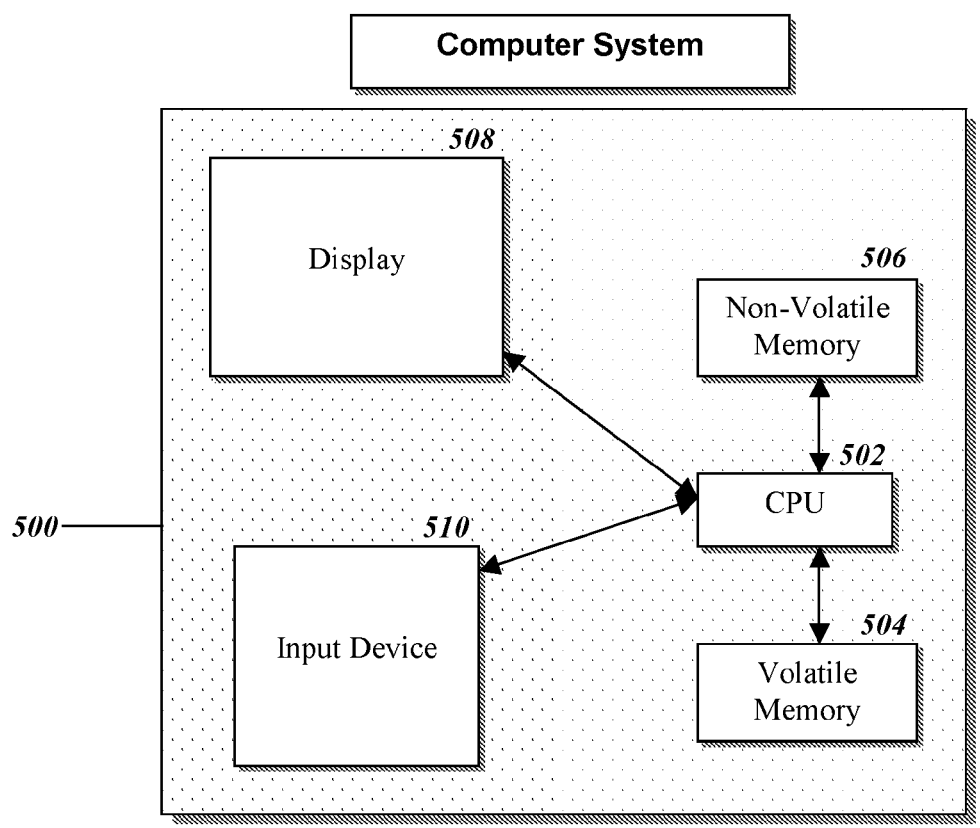
FIG. 8 depicts a computer system for implementing the methods described in this disclosure.

Referring now to FIG. 8, which depicts a computer system 500 for implementing the method of this disclosure, a display 508, input device 510, CPU 502, volatile memory 504, and non-volatile memory 506 are shown. A software implementation of the method disclosed herein may be stored in volatile memory 504 and may interact with a CAD program which may also be stored in volatile memory. The CPU 502 executes instructions of the software implementation and can accept human user input from an input device 510 and can display results to a display 508 or store results to non-volatile memory 506.

Referring now to FIG. 9, a sample GUI 616 for one implementation of the method of this disclosure is shown. The GUI displays various calculated parameters including inside diameter 602, perimeter 604, cross-section area 606, straight length of straight segments 608, bend angle for bending segments 610, total length of the ducting system 614, and a prompt to save the calculated data 612.

Many modifications and variations may of course be devised given the above description of the principles of the disclosure. It is intended that all such modifications and variations be considered as within the spirit and scope of this disclosure, as defined in the following claims.

I claim:

1. A computer-implemented method for identifying analytical transitional cross-sections from a 3D CAD model of a rigid transport element, wherein the method accepts as input a list of total edges from the 3D CAD model, a list of total faces from the 3D CAD model, and a list of connecting edges, comprising:
   identifying, by a computer, all edges from said list of total edges which have connectivity with any edge in said list of connecting edges and are part of a cross-section, and placing the identified edges into a list of cross-section edges; and
   identifying, by a computer, an analytical transitional cross-section that lies on a plane defined by the edges in said list of cross-section edges.

2. A method as in claim 1, wherein identifying all edges from said list of total edges which have connectivity with any edge in said list of connecting edges and are part of a cross-section and placing the identified edges into a list of cross-section edges comprises:
   identifying all edges from said list of total edges which have connectivity with any edge in said list of connecting edges;
   placing the identified edges into a list of candidate cross-section edges;
   removing, from the list of candidate cross-section edges, all edges which do not lie on a cross-section of the rigid transport element; and
   placing the edges in the list of candidate cross-section edges into the list of cross-section edges.

3. A method as in claim 2, further comprising:
   removing all edges in said list of connecting edges from said list of total edges;
   identifying all edges which lie on the plane defined by the list of cross-section edges and placing the identified edges into the list of cross-section edges;
   removing all edges in the list of cross-section edges from said list of total edges.

4. A method as in claim 3, further comprising:
   replacing all edges in said list of connecting edges with all edges in said list of total edges which have connectivity with any edge in the list of cross-section edges.

5. A computer-implemented method for identifying analytical transitional cross sections of a 3D CAD model of a rigid transport element, wherein the method accepts as input a list of total edges, a list of total faces, a list of connecting edges, and a list of candidate cross-section edges, said method comprising:
   (a) retrieving, by a computer, a list of cross-section edges from said list of total edges;
   (b) replacing, by a computer, any edges in said list of connecting edges with all edges in said list of total edges which have connectivity with the edges in said list of cross-section edges;
   (c) removing, by a computer, from said list of total edges, the edges in said list of connecting edges and the edges in said list of cross-section edges;
   (d) replacing, by a computer, any edges in said list of candidate cross-section edges with all edges in said list of total edges that have connectivity with the edges in said list of connecting edges;
   (e) removing, by a computer, from said list of candidate cross-section edges, all edges that do not share a face with any edge in said list of connecting edges; and
   (f) replacing, by a computer, any edges in the list of cross-section edges with all edges in the list of total edges that lie on a plane defined by the edges in the list of candidate cross-section edges.

6. The method of claim 5, wherein replacing any edges in the list of cross-section edges with all edges in the list of total edges that lie on the plane defined by the edges in the list of candidate cross-section edges comprises:
   identifying the plane on which all edges in the list of candidate cross-section edges lie;
   adding the identified plane to a list of cross-section planes;
   replacing any edges in the list of cross-section edges with all edges in the list of total edges which lie on the identified plane.

7. The method of claim 5, wherein retrieving a list of cross-section edges from said list of total edges comprises:
   accepting an operator's selection of all edges in an end cross-section.

8. The method of claim 5, wherein retrieving a list of cross-section edges from said list of total edges comprises:
   accepting an operator's selection of two edges in an end cross-section;
   forming a 2D plane from said two edges; and
   retrieving all edges from said list of total edges which lie on said 2D plane and placing those edges into a list of cross-section edges.

9. The method of claim 5, wherein retrieving a list of cross-section edges from said list of total edges comprises:
   retrieving, from the list of total edges, all topological edges of which no duplicate exists, and placing those edges in a list of end-cross-section edges;
   choosing an edge from the list of end-cross-section edges and placing it in a list of cross-section edges;
   retrieving, from the list of end-cross-section edges, all edges that have connectivity with the edge in the list of cross-section edges;
   placing all edges in the list of end-cross-section edges which lie on the same plane as the edges in the list of cross-section edges into the list of cross-section edges.

10. The method of claim 9, wherein placing all edges in the list of end-cross-section edges which lie on the same plane as the edges in the list of cross-section edges into the list of cross-section edges comprises:
- forming a 2D plane on which all edges in the list of cross-section edges lie;
- identifying from the list of end-cross-section edges, all edges that lie on the 2D plane, and placing the identified edges into the list of cross-section edges.

11. The method of claim 5, wherein replacing any edges in said list of candidate cross-section edges with all edges in the list of total edges that have connectivity with the edges in said list of connecting edges comprises:
- removing all edges from the list of candidate cross-section edges;
- identifying all edges in said list of total edges that have connectivity with the edges in said list of connecting edges; and
- placing the identified edges into the list of candidate cross-section edges.

12. The method of claim 5, wherein removing, from the list of candidate cross-section edges, all edges which do not share a face with any edge in the list of connecting edges comprises:
- (a) identifying an identified edge from the list of candidate cross-section edges;
- (b) finding all faces in the list of total faces which border on the identified edge and placing said faces into a list of bordering faces;
- (c) searching for any edges in said list of connecting edges which border on a face in said list of bordering faces;
- (d) removing from said list of candidate cross-section edges, the identified edge if no edge is identified in step (c);
- (e) repeating steps (a) through (d) until all edges in said list of candidate cross-sections have been examined.

13. The method of claim 5, further comprising repeating steps (b) through (f) until a stop condition is met.

14. The method of claim 13, wherein said stop condition is met when there are no edges remaining in said list of total edges.

15. The method of claim 5, further comprising:
- verifying that the 3D CAD model is a 3D CAD model of a rigid transport element.

16. The method of claim 15, further comprising:
- verifying that the 3D CAD model is a model of an inner surface of a rigid transport element.

17. The method of claim 5, further comprising:
- calculating circumference of each intersectional curve, and if it is round, also calculating the radius;
- calculating the area of each cross section; and
- calculating the length between any two adjacent cross sections if they are cross-sections of a straight segment, or if the segment is not straight, calculating the curve length of the bending curve between the two adjacent cross sections, as well as the bending angle and bending radius.

18. The method of claim 17, further comprising:
- displaying the area, circumference and radius of each intersectional curve to an application GUI; and
- displaying the length between any two adjacent cross sections, or curve length, bending angle and bending radius to an application GUI.

19. The method of claim 17, further comprising:
- saving any calculated data to non-volatile memory.

20. A computer system comprising:
a computer having a central processing unit and memory for executing machine instructions, the memory containing instructions directing the central processing unit to:
- (a) retrieve a list of total edges and a list of total faces from a 3D CAD model of a rigid transport element;
- (b) form a list of cross-section edges by choosing edges from said list of total edges;
- (c) find a cross-section plane on which all edges in said list of cross-section edges lie, and add said cross-section plane to a list of cross-section planes;
- (d) add all edges from the list of total edges which lie on the cross-section plane to the list of cross-section edges;
- (e) retrieve a list of connecting edges which have connectivity with the edges in the list of cross-section edges;
- (f) remove, from the list of total edges, the edges in the list of connecting edge and the edges in the list of cross-section edges;
- (g) retrieve all edges in said list of total edges which share a face with any edge in said list of connecting edges, and replace the edges in said list of cross-section edges with the retrieved edges;
- (h) repeat steps (c) through (g) until all cross-section planes in the 3D CAD model are found.

* * * * *